United States Patent
Batten-Carew et al.

(10) Patent No.: US 6,603,857 B1
(45) Date of Patent: Aug. 5, 2003

(54) METHOD AND APPARATUS FOR CONTROLLING RELEASE OF TIME SENSITIVE INFORMATION

(75) Inventors: Mark Christopher Batten-Carew, Kanata (CA); Michael James Wiener, Nepean (CA)

(73) Assignee: Entrust Technologies Limited, Ottawa (CA)

( * ) Notice: Subject to any disclaimer, the term of this patent is extended or adjusted under 35 U.S.C. 154(b) by 0 days.

(21) Appl. No.: 08/892,355

(22) Filed: Jul. 14, 1997

(51) Int. Cl.⁷ .............................. H04L 9/00; H04K 1/00
(52) U.S. Cl. ......................... 380/44; 380/273; 380/260; 380/46
(58) Field of Search ........................... 380/48, 44, 273, 380/260, 45, 46

(56) References Cited

U.S. PATENT DOCUMENTS

| | | | | |
|---|---|---|---|---|
| 4,145,569 A | * | 3/1979 | Ehrat ........................... 178/22 |
| 4,800,590 A | * | 1/1989 | Vaughan ....................... 380/25 |
| 4,809,327 A | * | 2/1989 | Shima .......................... 380/21 |
| 4,811,393 A | * | 3/1989 | Hazard ......................... 380/21 |
| 4,819,267 A | * | 4/1989 | Cargile et al. ................ 380/23 |
| 4,881,264 A | * | 11/1989 | Merkle ........................ 380/25 |
| 4,944,008 A | * | 7/1990 | Piosenka et al. .............. 380/46 |
| 5,146,498 A | | 9/1992 | Smith |
| 5,216,715 A | * | 6/1993 | Markwitz ..................... 380/21 |
| 5,325,433 A | * | 6/1994 | Torii et al. .................... 380/44 |
| 5,341,426 A | * | 8/1994 | Barney et al. ................. 380/21 |
| 5,412,722 A | * | 5/1995 | Sherly et al. .................. 380/21 |
| 5,457,746 A | * | 10/1995 | Dolphin ......................... 380/4 |
| 5,481,613 A | * | 1/1996 | Ford et al. .................... 380/21 |
| 5,581,614 A | * | 12/1996 | Ng et al. ....................... 380/20 |
| 5,600,720 A | * | 2/1997 | Iwamura et al. ................ 380/1 |
| 5,604,807 A | * | 2/1997 | Yamaguchi et al. .......... 380/48 |
| 5,625,694 A | * | 4/1997 | Lee et al. ...................... 380/23 |
| 5,720,034 A | * | 2/1998 | Case ............................ 380/21 |
| 5,774,550 A | * | 6/1998 | Brinkmeyer et al. .......... 380/21 |
| 5,784,460 A | * | 7/1998 | Blumenthal et al. .......... 380/21 |
| 5,793,973 A | * | 8/1998 | Birdwell et al. ....... 395/200.53 |
| 5,802,175 A | * | 9/1998 | Kara ............................ 380/21 |
| 5,805,705 A | * | 9/1998 | Gray et al. ................... 380/48 |
| 5,805,712 A | * | 9/1998 | Davis ........................... 380/44 |
| 5,811,770 A | * | 9/1998 | Bonnemoy ................... 235/380 |
| 5,825,876 A | * | 10/1998 | Peterson, Jr. .................. 380/4 |
| 6,157,723 A | * | 12/2000 | Schultz |

FOREIGN PATENT DOCUMENTS

JP      0174142   *   7/1989              380/48

OTHER PUBLICATIONS

Schneier, Bruce, applied Cryptography, 1996, pp. 53 & 180.*
www.ece.cmu.edu/~adrian/projects/stream/draft–irtf–smug–tesla–00.txt, Nov. 17, 2000.*

* cited by examiner

*Primary Examiner*—Gilberto Barron
*Assistant Examiner*—Douglas Meislahn

(57) ABSTRACT

A method and apparatus for controlling release of time-sensitive information is accomplished by a server that establishes access information for a specific future time which only becomes active once the specific future time has passed. When the specific future time has passed, the server releases the access information such that an end-user or end-users may utilize the access information to obtain time-sensitive information. The access information may be a random number which can be used to calculate a decryption key and an encryption key. The encryption key can be released by the server at any time such that an end-user may encrypt time sensitive information for release at the specific future time, but the random number is not released until the specific future time has passed. When the random number is released, end-users may generate the decryption key and subsequently decrypt the time-sensitive information.

31 Claims, 4 Drawing Sheets

METHOD AND APPARATUS FOR CONTROLLING RELEASE OF TIME SENSITIVE INFORMATION

TECHNICAL FIELD OF THE INVENTION

This invention relates generally to conveyance of information and more particularly to controlling the release of time sensitive information.

BACKGROUND OF THE INVENTION

Conveyance of data between parties is known. Such conveyance may be done over wireline transmission paths such as telephone lines, the Internet, etc., and done between data devices such as facsimile machines, computers, etc. Additionally, conveyance of information may be done over wireless transmission paths between wireless communication devices such as portable radios, portable computers that include an RF transceiver, personal digital assistance (PDA), etc. The information conveyed between parties, whether over a wireless communication path or wire line communication path, may be transmitted in a secure manner utilizing encryption and decryption algorithms or may be transmitted in clear text.

For secured conveyances of data, the sending party encrypts the data using an encryption algorithm and a particular key. The key may be a public encryption key of the intended recipient or a unique key for this particular communication. Having encrypted the information, the sending party transmits the encrypted data along with an indication of the particular key to the recipient party. Upon receiving the encrypted data, the recipient obtains, or recaptures, the key and subsequently decrypts the data.

If such data, whether in clear text or in a secured manner, is transmitted to multiple parties, each of the receiving parties may receive the data at different times. For example, if a company is releasing internal information as to a reorganization, the employees at the corporate headquarters, where the message was originated, would most likely receive the message considerably sooner than employees stationed in other parts of the country and/or world. Such information could be considered to be time-sensitive if the releasing party wants the recipients to have access to the data at the same future time.

Currently, if the releasing party is releasing time-sensitive information, the releasing party has to rely on the recipients to access the information only when requested to do so. In other words, the releasing parties has to rely on the integrity of the recipients not to access the information before requested. While most people would honor the request, some would not. Therefore, a need exists for a method and apparatus that provides the releasing party with automatic control over the releasing of time-sensitive information.

DETAILED DESCRIPTION OF THE DRAWINGS

Generally, the present invention provides a method and apparatus for controlling release of time-sensitive information. This may be accomplished by a server establishing access information for a specific future time which only becomes available once the specific future time has passed. When the specific future time has passed, the server releases the access information such that an end-user or end-users may utilize the access information to obtain time-sensitive information. The access information may be a random number which can be used to calculate a decryption key and an encryption key. The encryption key can be released by the server at any time such that an end-user may encrypt time sensitive information for release at the specific future time, but the random number is not released until the specific future time has passed. When the random number is released, end-users may generate the decryption key and subsequently decrypt the time-sensitive information. With such a method and apparatus, time-sensitive information can be released at any time and accessed only at a specific future time based on the release of access information relating to the specific future time.

Figure 1:
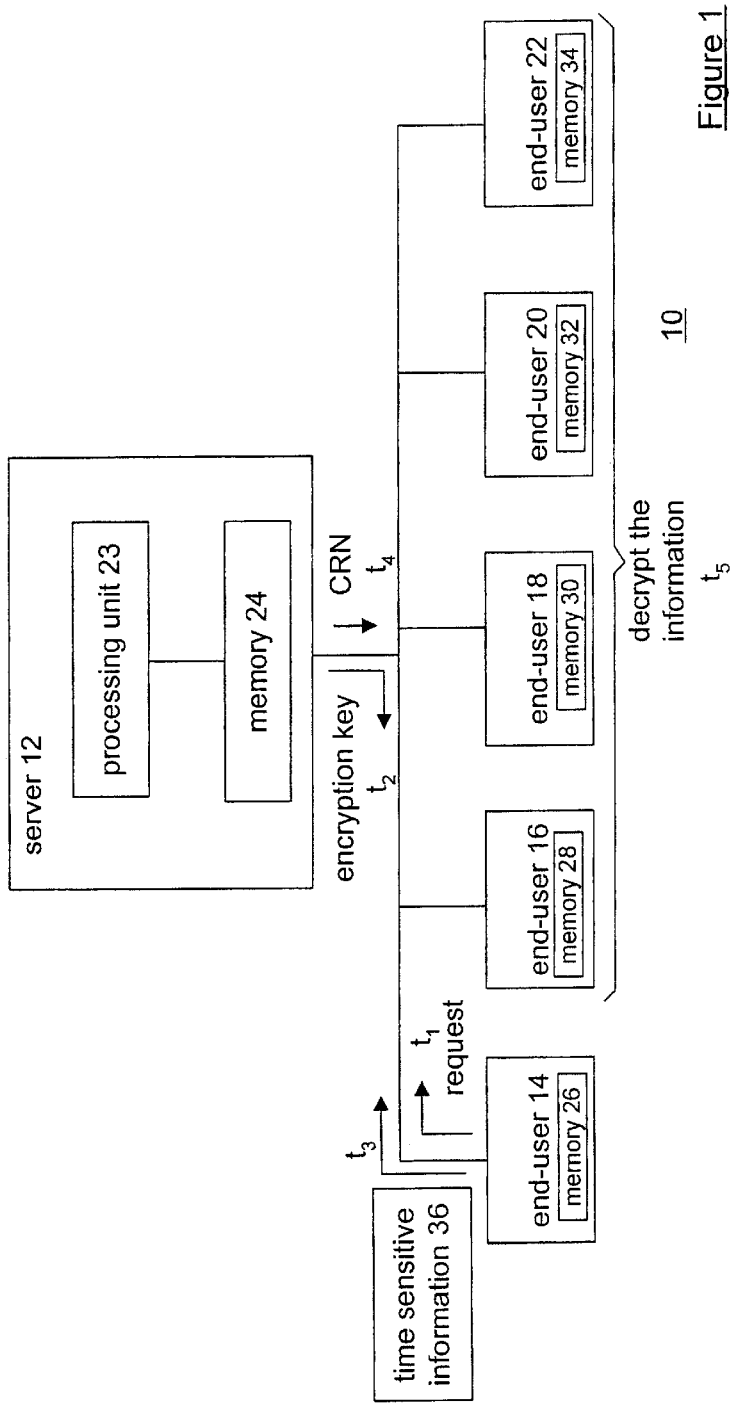
FIG. 1 illustrates a schematic block diagram of a local area network or wide area network which is in accordance with the present invention.
Figure 1:
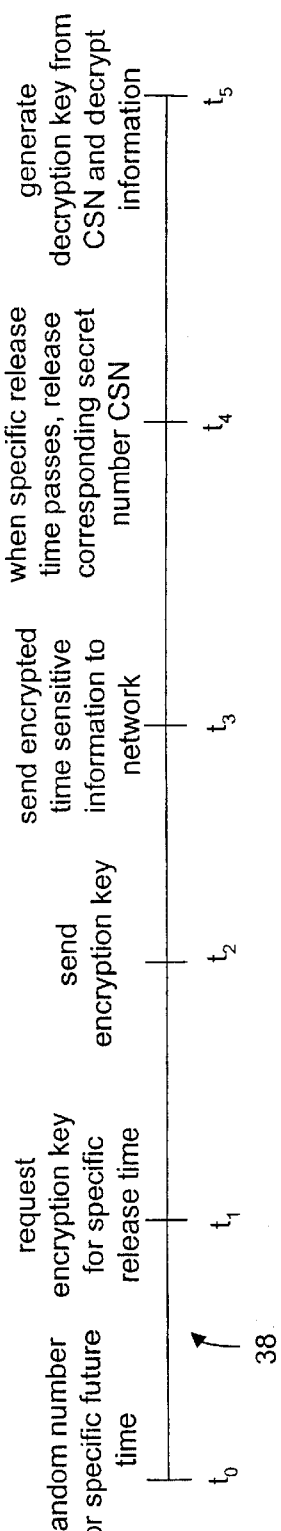

The present invention can be more fully described with reference 1 through 6. FIG. 1 illustrates a wide area network ("WAN") or local area network ("LAN") 10 that includes a server 12 and a plurality of end-users 14–22. Each of the end-users 14–22 include memory 26–34. Such memory may be random access memory, read-only memory, hard drive, disk drive and associated disks, or any other means for storing digital information. The server 12 includes a processing unit 23 and memory 24. The processing unit may be a microprocessor, micro-controller, microcomputer, digital signal processor or any other device that manipulates digital information based on programming instructions. The memory may be read-only memory, RAM, magnetic tape, hard drive, CD ROM, disk drive and associated disks, or any other means for storing digital information. Typically, the memory 24 will store programming instructions such that, when read by the processing unit 23, causes the processing unit 23 to perform the functions illustrated in one of, or all of, the logic diagrams of FIGS. 3 through 6. Note that the server 12 and the end-users 12–22 may be personal computers, work stations, or any other device that manipulated digital information based on programming instructions. Further note that the server 12 may be incorporated in one or more of the end-users 14–22, but, for the convenience of this discussion, will be discussed as a separate entity.

In an example of operation, assume that an end-user 14 has time sensitive information that it desires to be released at some future point-in-time, where the time-sensitive information may be a press release, a corporate announcement, release of a combination for a bank safe, or any type of information that a user desires to release to a recipient or plurality of recipients at a specific future time. Having decided to release time sensitive information, the end-user 14 sends a request for an encryption key to the server 12 via the WAN or LAN, which may be the Internet, asynchronous transfer mode infrastructure, or any other means for conveying digital data between sites.

Figure 2:
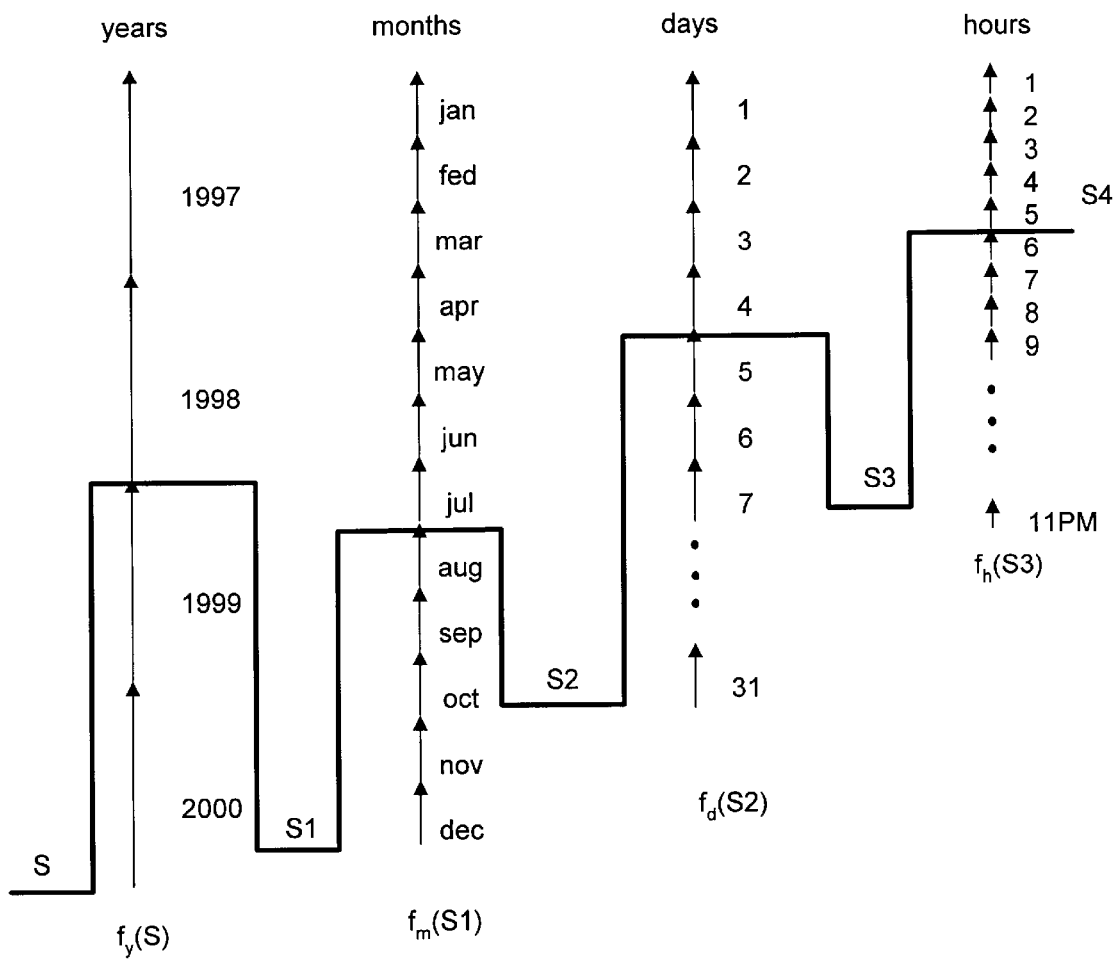
FIG. 2 illustrates a graphical representation of a calculation for a release of time sensitive information in accordance with the present invention.

Prior to granting the end-user's 14 request, the server 12 generates, at time $T_0$, a specific random number for a specific future time. For example, the specific future time may be 20 years from today's date. For this specific future time, a random number is generated. From this random number, iteratively using a one-way function, such as SHA-1, secret numbers may be generated for any time prior to the specific future time and for any time interval. For example, secret numbers may be iteratively generated at hour increments dating back from the specific future time, which, as stated, may be 20 years from today's date. Thus, if a straight forward one-way function were utilized a 175,000 calculations of the one-way function would need to be performed to obtain the secret number of the first hour of today, which is the first hour of the first day of the first month of the first year of the time controlled releasing period. The discussion involving FIG. 2 presents a technique for calculating secret numbers for any time within the time controlled releasing period using a maximum of 84 calculations for a 20 year period.

Continuing with the example, as mentioned, at $T_1$, end-user 14 has time-sensitive information 36 which it desires to release at some future point-in-time and has made a request to the server 12 for an encryption key. The request identifies the future point-in-time when the time-sensitive information is to be released and may or may not contain the time sensitive information. If it includes the time sensitive information, the server 12 will encrypt the information and release the encrypted information. If the request does not include the information, the end-user will encrypt the information and release the encrypted information. Upon receiving the request, the server 12 calculates a secret number for the specified future point-in-time based on the specific future time, the specified future point-in-time specified, the random number, and the one-way function. Once the secret number has been calculated, the server generates a key pair. If the system is employing a Diffie Hellman or elliptic curved cryptic system, a private key can simply be the secret number with a corresponding public key being dependent thereon. If, however, the system is employing an RSA technique, the secret number is used to generate a unique private decryption key and a corresponding public encryption key.

Having generated the public encryption key, the server 12, at time $T_2$, sends the encryption key to the end-user 14. Upon receiving the encryption key, the end-user 14 encrypts the time-sensitive information 36 and transmits it to the network at time $T_3$. At this point, each of the recipient end-users will have a copy of the encrypted time-sensitive information 36. However, none of the recipients may decrypt the information until the specified future point-in-time has passed.

When the specified future point-in-time has passed, the server 12 releases the corresponding secret number ("CSN") at time $T_4$. At this time, each of the recipient end-users 16–22 receive the corresponding secret number and subsequently generates the private decryption key therefrom. As one skilled in the art will readily appreciate, the secret numbers corresponding to any future time must be keep confidential until the corresponding time has passed.

Once the decryption key has been obtained, at $T_5$, from the corresponding secret number, the recipient end-users 16–22 decrypt the time-sensitive information to obtain the clear text representation thereof. Thus, the present invention achieves time-released cryptography with the desirable properties that time-enforcement is done using a server which can be controlled and the server need not deal directly with data to be encrypted.

FIG. 2 illustrates a graphical representation of a calculation of a plurality of random numbers that correspond to a specific future release time or a specific future point-in-time. In this example, the specific future point-in-time is 11:00 PM, Dec. 31, 2000. For this specific future point-in-time, one random number is generated by the server and is the only independent number for the entire time release process. The random number may then be used to calculate any secret number relating to a preceding point-in-time using the one-way functions for years $f_y(S)$, for months $f_m(S)$, for days $f_d(S)$, and for hours $f_h(S)$.

In general, given a secret number (S) corresponding to the last hour of the last day of the last month of the last year to be handled by the server for the time release process, i.e., final point-in-time or the specific future point-in-time, the last hour of the previous year is obtained by utilizing the one-way function for years $f_y(S)$. By performing $f_y(f_y(S))$, the secret number for the last hour of the next previous year is obtained. The secret number for the last hour of other previous years is obtained in the same manner. Within any given year upto and including the last year of the time release process, a secret number for the last hour of the last day of the next to last month may be obtained by utilizing the one-way function for months $f_m(S1)$, where S1 is the secret number corresponding to the last hour of the last day of the last month of the given year. By performing $f_m(f_m(S1))$, the secret number for the last hour of the last day of the second to last month is obtained. The secret number for the last hour of the last day of other previous months within the given year is obtained in the same manner.

Within any given month of any given year, a secret number may be obtained for the last hour of any day by performing the one-way function for days $f_d(S2)$ as many times as required to obtain the desired day, where S2 is the secret number corresponding to the last hour of the last day of the given month of the given year. For example, by performing $f_d(f_d(S2))$, the secret number for the last hour of the second to last day of the given month is obtained. The secret number for the last hour of other previous days within the given month is obtained in the same manner. A secret number for any hour in a given day of a given month of a given year can be obtained by utilizing the one-way function for hours $f_h(S3)$ as many times as required to obtain the desired hour, where S3 is the secret number corresponding to the last hour of the given day of the given month of the given year. For example, by performing $f_h(f_h(S3))$, the secret number for the second to last hour is obtained. The secret number for other previous hours within the given day of the given month of the given year is obtained in the same manner.

Continuing with the general discussion, when a specific release time, or point-in-time, arrives, the server must release the secret number corresponding to the current hour such that the corresponding decryption key may be calculated by an end-user. The end-user may further use the secret number for the current hour, to calculate a secret number, and the corresponding decryption key, for any previous hour in the current day using the one-way function for hours $f_h(S_{ch})$, where $S_{ch}$ is the secret number for the current hour.

If the end-user desires to calculate a secret number for any hour during the previous day in the current month, the server must also release the secret number corresponding to the last hour of the previous day $S_{pd}$. The end-user would then use the one-way function $f_h(S_{pd})$ as many times as required to obtain the desired secret number. In, addition, from this secret number $S_{pd}$, the secret number of the last hour of any preceding day of the current month may be determined using the one-way function for days $f_d(S_{pd})$ as many times as required. From a secret number $S_d$ corresponding to a given day, a secret number may be calculated using the one-way function for hours $f_h(S_d)$ as many times as required for any hour within the given day.

To calculate secret numbers for hours in preceding months of the current month within the current year, the server needs to release the secret number $S_{pm}$ corresponding to the last hour of the last day of the previous month to the current month. To calculate the secret number for the last hour of the last day of a preceding month within the current year, the one-way function for months $f_m(S_{pm})$ is used as many times as required. Using the secret number for a previous month of the current year, the secret number for the last hour of any day may be obtained using the one-way function for days. From these secret numbers for days, secret numbers for any hour in a given day can be calculated using the one-way function for days. To calculate the secret number for previous hours of the last day of the previous month, the one-way function for hours $f_h(S_{pm})$ is used as many times as required. To calculate the secret number for the last hour of any day in the previous month, the one-way function for days $f_d(S_{pm})$ is used as many times as required. From a secret number $S_d$ corresponding to a given day within the previous month, a secret number may be calculated using the one-way function for hours $f_h(S_d)$ for any hour within the given day.

To obtain a secret number for any hour in a previous year, the server must release the secret number for the last hour of the last day of the last month for the previous year. From this secret number, any secret number can be determined for any hour using the one-way functions for hours, days, and months. As one skilled in the art will readily appreciate, given a secret number that corresponds to a given time (specified in hours, day, months, and/or years), a secret number may be calculated for any given previous time.

The example of FIG. 2 has the specified future point-in-time for the release of time-sensitive information being Jul. 4, 1998 at 6:00 a.m. To obtain the unique secret number for this time, the server 12 utilizes the random number for 11 PM, Dec. 31, 2000 and the one-way functions for years, months, days, and hours functions. To begin, the server 12 calculates a secret number (S1) for 11 PM, Dec. 31, 1998 by executing $f_y(f_y(S))$, where the nested $f_y(S)$ provides the secret number for 11 PM, Dec. 31, 1999, and the outer $f_y(S)$ provides the secret number (S1). Using the secret number S1, the server 12 calculates the secret number (S2) for the last hour of July, 1998 by performing the $f_m(S1)$ function five times. From S2, the server then calculates the secret number S3 for the last hour of Jul. $4^{th}$, 1998 by performing the $f_d(S)$ function twenty-seven times (31–4). From S3, the server calculates the secret number (S4) for 6 AM, Jul. $4^{th}$, 1998 by performing the $f_h(S3)$ sixteen times (23–6 ). 84 can then be used to generate an encryption key that is used to decrypt time sensitive information which was scheduled for release at 6 AM, Jul. $4^{th}$, 1998. Note that S1, S2, and S3 are secret number components of the secret number for 6 AM, Jul. $4^{th}$, 1998.

Given the secret number (S4) for 6 AM, July $4^{th}$, 1998 and secret numbers for the last hour of the previous day $f_d(S3)$ (or $f_m(S2)$ if S4 corresponds to the first day of the month), the secret number for the last hour of the previous month $f_m(S2)$ (or $f_y(S1)$ if S4 corresponds to the first month of the year), and the secret number for last hour of the previous year $f_y(S1)$, the end-user can calculate any previous secret number and the associated decryption key.

As mentioned with reference to FIG. 1, if a 20-year span has been established for the time release period, the server would need to perform 175,000 calculations of a one-way function to obtain the secret number for the first hour of the first day of the first month of the first year of the release period. By using the technique described above to determine a secret number relating to a specific point-in-time, the maximum number of calculations to obtain any secret number for the 20 year period is down from 175,000 to 84.

Figure 3:
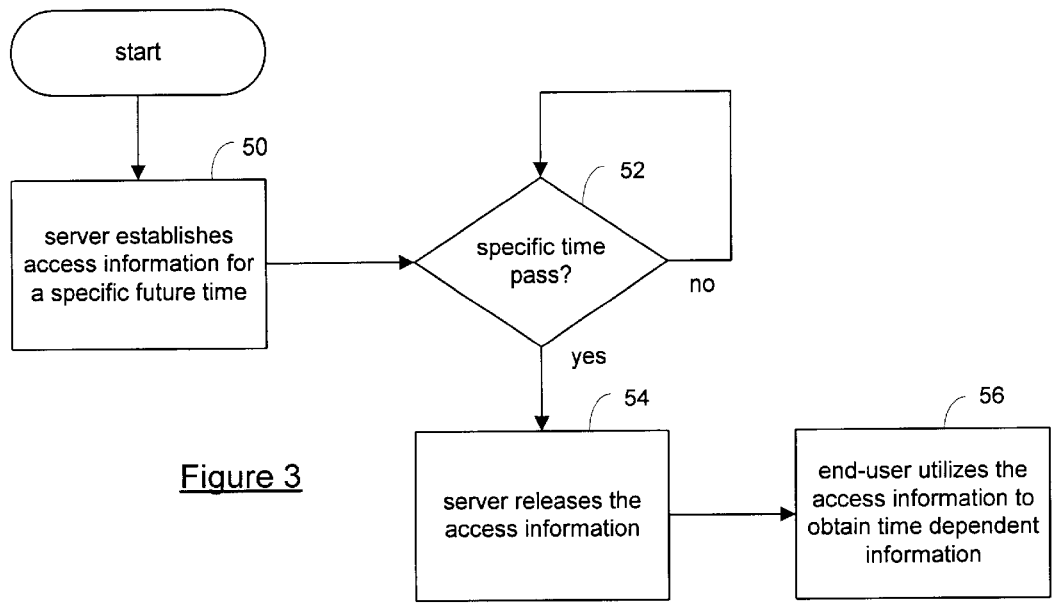
FIG. 3 illustrates a logic diagram for controlling release of time-sensitive information.

FIG. 3 illustrates a logic diagram for accessing time-sensitive information. The process begins at step 50 where a server establishes access information for a specific future time. The access information may be a random number which would be used for encryption and decryption purposes, a combination for a bank safe, or any other access controlling information which can be time-released. Note that the access information is for a specific future time.

Having established the access information, the process proceeds to step 52 where a determination is made as to whether the specific future time has passed. If not, the process waits until the specific future time passes. Once the specific future time passes, the process proceeds to step 54 where the server releases the access information. Upon release of the access information, the process proceeds to step 56 where an end-user may utilize the access information to obtain time-sensitive information. Note that any time after the specific future time passes, the end-user may utilize the access information to obtain the time-sensitive information. For example, if the specific future time where Jul. 4, 1998 at 6:00 a.m., the end-user any time thereafter could utilize the access information to obtain the time-sensitive information.

Figure 4:
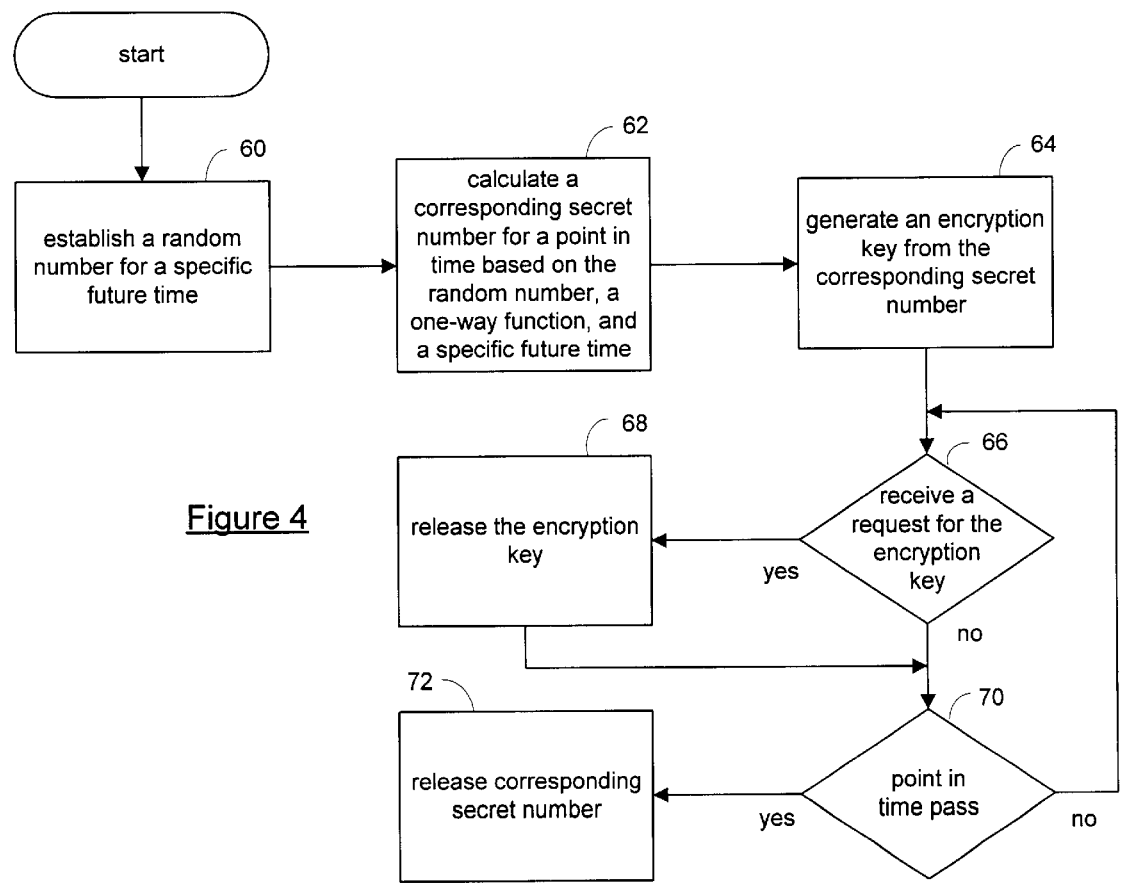
FIG. 4 illustrates a logic diagram for encrypting time-sensitive information and subsequently releasing information such that the time-sensitive information may be decrypted in accordance with the present invention.

FIG. 4 illustrates a logic diagram for encrypting time-sensitive information and subsequently decrypting the time-sensitive information once a specific point-in-time has passed. The process begins at step 60 where a server establishes a random number for a specific future time. Such a process was discussed previously with reference to FIGS. 1 and 2. The process then proceeds to step 62 where a calculation is made to determine a corresponding secret number for a point-in-time. Such a calculation is based on the random number, a one-way function, the point-in-time, and the specific future time. Having generated the corresponding secret number, the process proceeds to step 64. At step 64, an encryption key is generated from the corresponding secret number. As previously mentioned for RSA, the corresponding secret number would be used to generate a public encryption key while for Diffie Hellman encryption, the corresponding secret number would be the encryption key.

The process then proceeds to step 66 where a determination is made as to whether a request for the encryption key has been received. If so, the process proceeds to step 68 where the server releases the encryption key. Once the encryption key is released, or no requests have been received for release of the encryption key, the process proceeds to step 70. At step 70, a determination is made as to whether the point-in-time has passed. If not, the process reverts back to step 66, where the system waits for either a request for the encryption key, or the point-in-time to pass. Once the point-in-time has passed, the process proceeds to step 72 where the server releases the corresponding secret number. As previously discussed, once the corresponding secret number has been released, the recipient end-users may calculate a private decryption key from the corresponding secret number. As one skilled in the art will readily appreciate, by utilizing the one-way function such as SHA-1, end-users cannot determine future secret numbers based on a current secret number. Thus, the one-way function ensures that only corresponding secret numbers of points-in-time that have passed can be used to generate decryption keys. By controlling the generation of decryption keys, only time-sensitive information for which the corresponding specific point-in-time has passed will be accessible to recipients.

Figure 5:
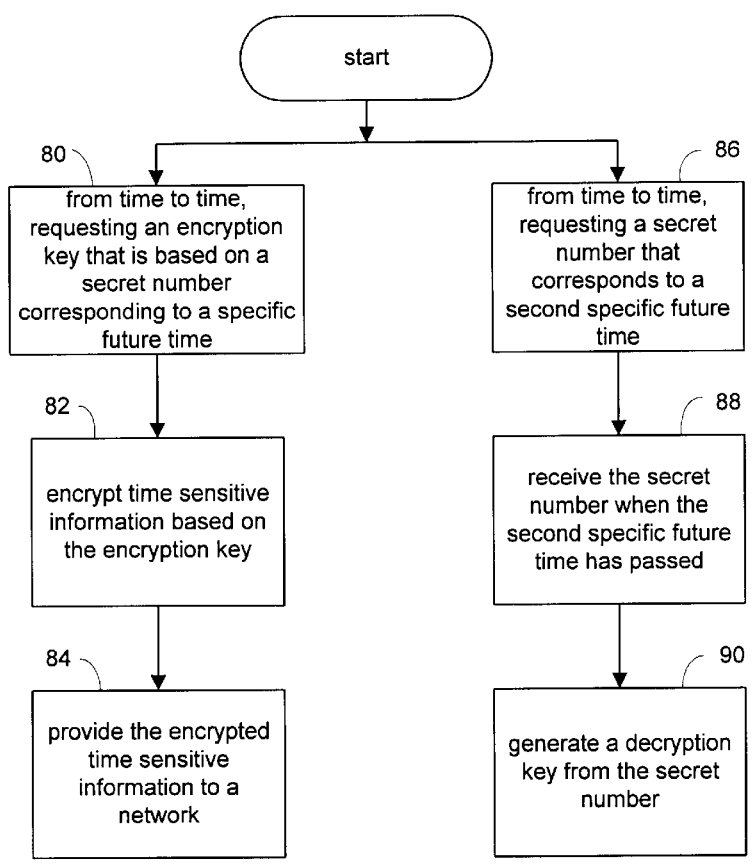
FIG. 5 illustrates a logic diagram that may be used by an end-user to prepare time sensitive information and also to receive time-sensitive information in accordance with the present invention.

FIG. 5 illustrates a logic diagram for an end-user to generate time-sensitive information and to obtain time-sensitive information. The process begins at step 80 where, from time to time, the end-user requests an encryption key that is based on a secret number corresponding to a specific future time. The requests would indicate the specific future time such that the server could calculate the corresponding secret number utilizing a one-way function. From the corresponding secret number, the server could generate the encryption key where the encryption key may be a public encryption key if RSA is used.

The process then proceeds to step 82 where the end-user encrypts time-sensitive information based on the encryption key. As previously mentioned, the time-sensitive information may be a corporate announcement, a press release, stock information, banking information, combinations for safety deposit boxes, safes, etc., or any other information that a transmitting party would want the designated recipients to receive at a given time. The process then proceeds to step 84 where the encrypted time-sensitive information is provided to a network such that the recipients may receive the encrypted time-sensitive information.

The process continues at step 86 where, from time to time, an end-user requests a secret number that corresponds to a second future specific time. The second specific future time relates to the time release for encrypted time-sensitive information. The process then proceeds to step 88 where the secret number is received when the second specific future time has passed. The process then proceeds to step 90 where a decryption key is generated from the secret number such that the encrypted time-sensitive information may be decrypted.

Figure 6:
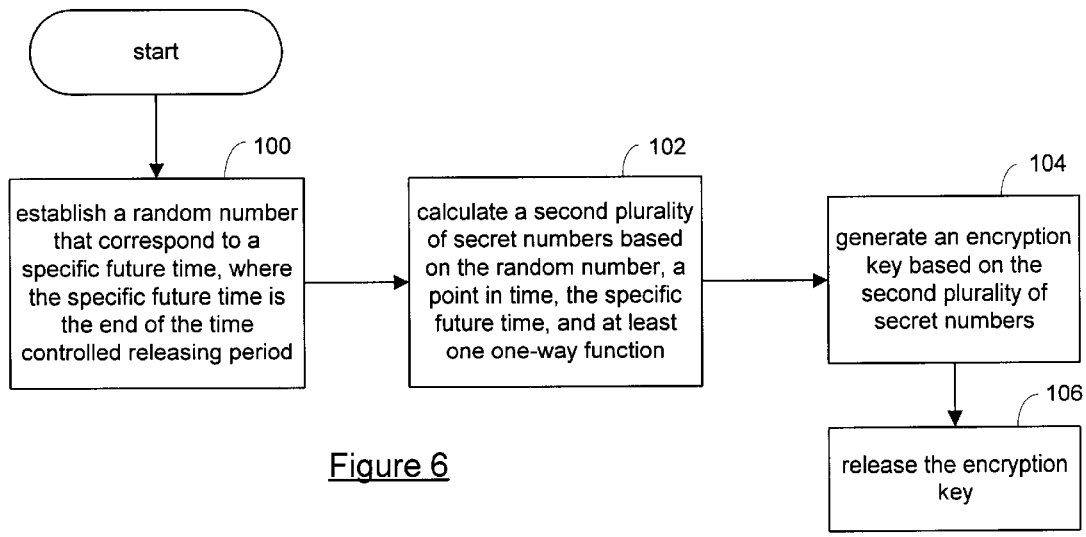
FIG. 6 illustrates a logic diagram for preparing time-sensitive information in accordance with the present invention.

FIG. 6 illustrates a logic diagram for utilizing a plurality of random numbers to represent a specific future time and intervening times. The process begins at step 100 where a random number is established for a specific future time, i.e., the end of the time controlled releasing period. The process then proceeds to step 102 where a plurality of secret numbers are calculated based on the random number, a point-in-time, the specific future time, and at least one one-way function. For example, referring to the example of FIG. 2 where the point-in-time is Jul. 4, 1988 at 6:00 a.m., the plurality of secret numbers would be S1 for 11 PM, Dec. $31^{st}$, 1998, S2 for 11 PM, Jul. $31^{st}$, 1998, S3 for 11 PM, Jul. $4^{th}$, 1998, and S4 for 6 AM, Jul. $4^{th}$, 1998.

The process then proceeds to step 104 where an encryption key is generated based on the second plurality of random numbers. In particular, the encryption key for the 6 AM, Jul. $4^{th}$, 1998 release time, would be based on the secret number S4, which is derived from the plurality of secret numbers S1, S2, and S3. Having generated the encryption key, the process proceeds to step 106 where the encryption key is released such that time-sensitive information may be encrypted using the encrypted key.

The preceding discussion has presented a method and apparatus for controlling release of time-sensitive information. The control is obtained by having a server establish a random number for a future given time and calculating, using a one-way function, corresponding secret numbers for points-in-time that occur prior to the future specific time. By utilizing a one-way function to calculate the secret numbers, only secret numbers that correspond to times that have passed can be calculated. As such, the release of time-sensitive information is done in a controlled manner with assurances that the recipients will not have access to the data prior to the specific release time.

What is claimed is:

1. A method for controlling release of time sensitive information, the method comprising the steps of:

a) establishing, by a server, access information for a specified future point in time, wherein the access information is derived for the specified future point in time based on a specific future time and a specific random number using a random number generation process, wherein the specified future point in time is chronologically prior to the specific future time;

b) releasing, by the server, the access information when the specified future point in time has passed; and c) utilizing the access information by an end-user to decipher the time sensitive information.

2. The method of claim 1 further comprises:

establishing the accessing information to be a random number; and generating, by the server, an encryption key based on the random number, wherein the time sensitive information is encrypted based on the encryption key.

3. The method of claim 2 further comprises, within step (c), utilizing the random number to generate a unique decryption key and utilizing the decryption key to decipher the time sensitive information.

4. The method of claim 2 further comprises:

releasing, by the server, the encryption key; and encrypting the time sensitive information based on the encryption key by another end-user, prior to the specified point in time.

5. The method of claim 1 further comprises establishing the access information to be a lock combination.

6. The method of claim 2 further comprises:

calculating, by the server, the random number for the specified point in time based on a one-way function, the specific future time, and the specific random number, wherein the specified point in time occurs, in time, prior to the specific future time; and releasing, by the server, the random number when the point in time has passed.

7. The method of claim 2 further comprises:

calculating, by the server, a plurality of corresponding secret numbers for a plurality of points in time based on a one-way function, the specific future time, and the specific random number, wherein each of the plurality of points in time occurs, in time, prior to the specific future time and wherein the plurality of points in time are time sequenced; and releasing, by the server, one of the plurality of corresponding secret numbers that corresponds to one of the plurality of points in time which is most current in time.

8. The method of claim 7 further comprises, within step (c), calculating, based on the one-way function, a previous secret number of the plurality of corresponding secret numbers from the one of the plurality of corresponding secret numbers; and generating a unique decryption key from the previous secret number.

9. The method of claim 7 further comprises utilizing a plurality of secret number components to calculate each of the plurality of corresponding secret numbers.

10. The method of claim 9 further comprises utilizing different one-ways functions to obtain the plurality of secret number components.

11. The method of claim 1 further comprises, within step (b), releasing the access information when a request for the access information has been received and the request was received after the specified future point in time has passed.

12. A method for controlling release of access information that is used to decipher time sensitive information, the method comprising the steps of:

a) establishing a random number for a specific future time;

b) calculating a corresponding secret number for a point in time based on the random number, a one-way function, and the specific future time, wherein the point in time occurs, in time, prior to the specific future time;

c) generating an encryption key based on the corresponding secret number;

d) providing the encryption key when a request is received for the encryption key; and e) providing the corresponding secret key when the point in time has passed, wherein the access information is at least partially based on the corresponding random number.

13. The method of claim 12 further comprises, within step (e), providing the corresponding secret number when a request for the corresponding secret number is received and the point in time has passed.

14. The method of claim 12 further comprises:

calculating a plurality of corresponding secret numbers for a plurality of points in time based on the one-way function, the specific future time, and the random number, wherein each of the plurality of points in time occurs, in time, prior to the specific future time and wherein the plurality of points in time are time sequenced; and releasing one of the plurality of corresponding secret numbers that corresponds to one of the plurality of points in time which is most current in time.

15. The method of claim 14 further comprises utilizing a plurality of secret number components to calculate each of the plurality of corresponding secret numbers.

16. The method of claim 15 further comprises utilizing different one-ways functions to obtain the plurality of secret number components.

17. A method for processing time sensitive information, the method comprising the steps of:

a) from time to time, requesting an encryption key, wherein the encryption key is based on a random number corresponding to a specified point in time, wherein the random number is derived based on a specific random number that corresponds to a specific future time, and wherein the specified point in time occurs prior to the specified point in time;

b) encrypting the time sensitive information based on the encryption key to produce encrypted time sensitive information;

c) providing the encrypted time sensitive information to a recipient;

d) from time to time, requesting the random number;

e) receiving the random number when the specified point in time has passed; and f) generating a decryption key from the random number.

18. The method of claim 17 further comprises:

calculating a previous secret number based on the random number, the specified point in time, and a one-way function; and calculating a previous decryption key based on the previous secret number.

19. A method for controlling release of time sensitive information, the method comprising the steps of:

a) establishing a specific random number that corresponds to a specific future b) calculating a plurality of secret numbers based on the specific random number, points in time, the specific future time, and a plurality of one-way functions, wherein the points in time occur, in time, prior to the specific future time;

c) generating encryption keys based to the plurality of secret numbers; and d) releasing the encryption keys to encrypt data for distribution to facilitate a controlled release of time sensitive information.

20. The method of claim 19 further comprises releasing at least one of the plurality of secret numbers when a corresponding point in time has passed.

21. The method of claim 20 further comprises:

receiving a request for release of the plurality of secret numbers; and responding to the request after the point in time has passed.

22. A digital storage medium that stores programming instructions that, when read by a processing unit, causes the processing unit to control release of access information that is used to decipher time sensitive information, the digital storage medium comprising:

first storage means for storing programming instructions that, when read by the processing unit, causes the processing unit to establish a specific random number for a specific future time;

second storage means for storing programming instructions that, when read by the processing unit, causes the processing unit to calculate a corresponding secret number for a point in time based on the specific random number, a one-way function, and the specific future time, wherein the point in time occurs, in time, prior to the specific future time;

third storage means for storing programming instructions that, when read by the processing unit, causes the processing unit to generate an encryption key based on the corresponding secret number;

fourth storage means for storing programming instructions that, when read by the processing unit, causes the processing unit to provide the encryption key when a request is received for the encryption key; and fifth storage means for storing programming instructions that, when read by the processing unit, causes the processing unit to release the corresponding secret number when the point in time has passed, wherein the access information is at least partially based on the corresponding random number.

23. The digital storage medium of claim 22 further comprises, within the fifth storage means, programming instructions that, when read by the processing unit, causes the processing unit to release the corresponding secret number when a request for the corresponding secret number is received and the point in time has passed.

24. The digital storage medium of claim 22 further comprises, within the first storage means, programming instruction that, when read by the processing unit, causes the processing unit to:

calculate a corresponding secret numbers for a plurality of points in time based on the one-way function, the specific future time, and the random number, wherein each of the plurality of points in time occurs, in time, prior to the specific future time and wherein the plurality of points in time are time sequenced; and release one of the plurality of corresponding secret numbers that corresponds to one of the plurality of points in time which is most current in time.

25. The digital storage medium of claim 24 further comprises, within the first storage means, programming instructions that, when read by the processing unit, causes the processing unit to utilize a plurality of secret number components to calculate each of the plurality of corresponding random numbers.

26. A digital storage medium that stores programming instructions that, when read by a processing unit, causes the processing unit to control release of time sensitive information, the digital storage medium comprising:

first storage means for storing programming instructions that, when read by the processing unit, causes the processing unit to, from time to time, request an encryption key, wherein the encryption key is based on a random number corresponding to a specified point in time, wherein the random number is derived based on a specific random number that corresponds to a specific future time, and wherein the specified point in time occurs prior to the specific future time;

second storage means for storing programming instructions that, when read by the processing unit, causes the processing unit to encrypt the time sensitive information based on the encryption key to produce encrypted time sensitive information;

third storage means for storing programming instructions that, when read by the processing unit, causes the processing unit to provide the encrypted time sensitive information to a recipient;

fourth storage means for storing programming instructions that, when read by the processing unit, causes the processing unit to, from time to time, request the random number;

fifth storage means for storing programming instructions that, when read by the processing unit, causes the processing unit to receive the random number when the specified point in time has passed; and sixth storage means for storing programming instructions that, when read by the processing unit, causes the processing unit to generate a decryption key from the random number.

27. The digital storage medium of claim 26 further comprises means for storing programming instructions that, when read by the processing unit, causes the processing unit to:

calculate a previous secret number based on the random number, the specified point in time, and a one-way function; and calculate a previous decryption key based on the previous secret number.

28. A server comprising:

a processing unit; and memory that stores programming instructions that, when read by a processing unit, causes the processing unit to control release of time sensitive information, the memory includes:

first storage means for storing programming instructions that, when read by the processing unit, causes the processing unit to establish a random number for a specific future time;

second storage means for storing programming instructions that, when read by the processing unit, causes the processing unit to calculate a corresponding secret number for a point in time based on the random number, a one-way function, and the specific future time, wherein the point in time occurs, in time, prior to the specific future time;

third storage means for storing programming instructions that, when read by the processing unit, causes the processing unit to generate an encryption key based on the corresponding secret number;

fourth storage means for storing programming instructions that, when read by the processing unit, causes the processing unit to release the encryption key when a request is received for the encryption key; and fifth storage means for storing programming instructions that, when read by the processing unit, causes the processing unit to release the corresponding secret number when the point in time has passed.

29. The server of claim 28 further comprises, within the fifth storage means, programming instructions that, when read by the processing unit, causes the processing unit to release the corresponding secret number when a request for the corresponding secret number is received and the point in time has passed.

30. The server of claim 28 further comprises, within the first storage means, programming instructions that, when read by the processing unit, causes the processing unit to:

calculate a plurality of corresponding secret numbers for a plurality of points in time based on the one-way function, the specific future time, and the random number, wherein each of the plurality of points in time occurs, in time, prior to the specific future time and wherein the plurality of points in time are time sequenced; and release one of the plurality of corresponding secret numbers that corresponds to one of the plurality of points in time which is most current in time.

31. The server of claim 30 further comprises, within the first storage means, programming instructions that, when read by the processing unit, causes the processing unit to utilize a plurality of secret number components to calculate each of the plurality of corresponding secret numbers.

* * * * *